United States Patent [19]

Kojima et al.

[11] Patent Number: 5,408,333

[45] Date of Patent: Apr. 18, 1995

[54] WORK STATION APPARATUS WITH AN ELECTRONIC MAIL FUNCTION

[75] Inventors: Shunichi Kojima; Yasumasa Moriya, both of Kanagawa, Japan

[73] Assignee: Fuji Xerox Co., Ltd., Tokyo, Japan

[21] Appl. No.: 957,005

[22] Filed: Oct. 6, 1992

[30] Foreign Application Priority Data

Oct. 7, 1991 [JP] Japan .................................. 3-259410

[51] Int. Cl.⁶ .............................................. H04N 1/00
[52] U.S. Cl. .................................... 358/400; 358/402
[58] Field of Search ............... 358/400, 401, 402, 403; 395/159; 340/709, 721

[56] References Cited

U.S. PATENT DOCUMENTS 5,161,213 11/1992 Knowlton .
5,182,650  1/1993 Inoue ................................ 358/296
5,214,756  5/1993 Franklin ........................... 395/159

OTHER PUBLICATIONS

"Norton Desktop for Windows" *Symantec* Copyright 1991-1992; pp. 1-4, 6-6 to 6-8, 22-5 to 22-7 & 22-14 to 22-16.

"JStar Workstation," Akihiro Uetani, Maruzen Co., Ltd., pp. 213-243, Apr. 25, 1986. no translation.

*Primary Examiner*—Stephen Brinich
*Assistant Examiner*—Jerome Grant, II
*Attorney, Agent, or Firm*—Finnegan, Henderson, Farabow, Garrett & Dunner

[57] ABSTRACT

A work station apparatus includes an electronic mail function. In the work station apparatus, a transmission box icon and object icons indicative of objects to be transmitted are displayed on the display screen of a display unit, and an instruction for transmitting an electronic mail is given in a manner such that a desired object icon is selected from the object icons and is placed on the transmission box icon. The work station apparatus includes a storing unit for storing the destination data set in connection with the transmission box icon, a developing unit for developing the destination data into destination data of the data body corresponding to the object icon in response to the instruction for transmitting the electronic mail, and a transmitting unit for performing a transmission process of the data body according to the developed destination data.

5 Claims, 9 Drawing Sheets

FIG. 7(a)

WORK STATION APPARATUS WITH AN ELECTRONIC MAIL FUNCTION

BACKGROUND OF THE INVENTION

1. Field of the Invention

The present invention relates to a work station apparatus with an electronic mail function for transmitting/receiving data of documents or the like through a network.

2. Discussion of the Related Art

An electronic device, typically a work station apparatus, used for document formation and information management in offices, has been known. Some types of electronic devices have the function to electronically transmit information to a user of another work station apparatus in the form of a mail. This function is called an electronic mail. In the work station apparatus, to realize the mailing function, it is common practice that as shown in FIG. 11, two types of icons 52 and 53 on the electronic mail, such as a transmission box and a reception box, are contained in a work screen, which is called a desk top 50. In the figure, reference numerals 51a and 51b designate document icons. The transmission box 52 is for transmitting information on documents or the like. The reception box 53 is for picking up information on documents or the like destined to the user himself, who is handling the work station apparatus.

To transmit information to another user by using the electronic mail function, as shown in FIG. 12 which shows a flowchart, a document A to be transmitted is formed (step 101), and the document icon 51a for the document A is selected to transfer the data of information to the transmission box 52 (step 102). Then, an electronic mail option sheet is opened. The user writes down the address of a destination on the option sheet. If a copy replication is required, he also writes down the name of the destination for copy (step 103), and then he enters a transmitting instruction to the work station apparatus. In response to the instruction, the apparatus executes the processing for data transmission (step 104), whereby the contents of the document are transmitted through the network to another work station apparatus as the destination.

When the work station apparatus, which is handled by the user, receives an electronic mail destined to himself, the reception box 53 visually indicates the arrival of the mail. At this time, if he opens the reception box 53, a list of received mails is presented. Intact mails, or not yet opened mails, are attached with specific tags. With the tags, the user can know which mail is not yet opened. He can see the contents of the received mail after he designates a desired intact mail and opens it.

The electronic mail function is indispensable for exchanging information among work station apparatuses interconnected through a network. Particularly, electronic mails destined not only to individuals but also to groups have been used as useful tools for a groupware on the network.

However, in the work station apparatus with the electronic mail function, every time the user transmits an electronic mail, he must enter the name of a destination and, if required, the name of a destination for copy. Where he frequently communicates with a specific destination by the electronic mail, he must repeat the name entering operation many times. This entering work is troublesome and time-consuming, while being prone to mistakes during the entering operations.

A mail history containing past mails with time and data is prepared in some types of work stations. In the mail history, the necessary items, which are arranged merely time-sequentially, are inconvenient for managing the transmitted mails. For example, when the user desires to check an electronic mail transmitted to a specific destination, he must search the mail of a specific address from among many mails of different addresses. The main search work takes much time, while possibly disadvantaged from a mistake that searches an incorrect or unintended mail.

SUMMARY OF THE INVENTION

The present invention has been made in view of the above circumstances and has an object to provide a work station apparatus with an electronic mail function that can transmit a mail to a specific destination designated by a user, with a simplified transmitting procedure.

Another object of the present invention is to provide a work station apparatus with an electronic mail function that can efficiently manage transmitted mails.

To achieve the above objects, the present invention provides a work station apparatus having an electronic mail function in which a transmission box icon and object icons indicative of objects to be transmitted are displayed on a display screen of a display unit, and an instruction for transmitting an electronic mail is given in a manner that a desired object icon is selected among from the object icons, and is placed on the transmission box icon, the work station apparatus including storing means for storing destination data set in connection with the transmission box icon, developing means for developing the destination data into destination data of data body corresponding to the object icon in response to the instruction for transmitting the electronic mail, and transmitting means for performing a transmission processing of the data body according to the developed destination data.

BRIEF DESCRIPTION OF THE DRAWINGS

The accompanying drawings, which are incorporated in and constitute a part of this specification illustrate the embodiment of the invention and, together with the description, serve to explain the objects, advantages and principles of the invention. In the drawings.

FIG. 6 is a diagram showing an electronic option sheet displayed on the screen in a mail transmission mode;

DETAILED DESCRIPTION OF THE PREFERRED EMBODIMENT

The preferred embodiment of the present invention will be described with reference to the accompanying drawings.

Figure 1:
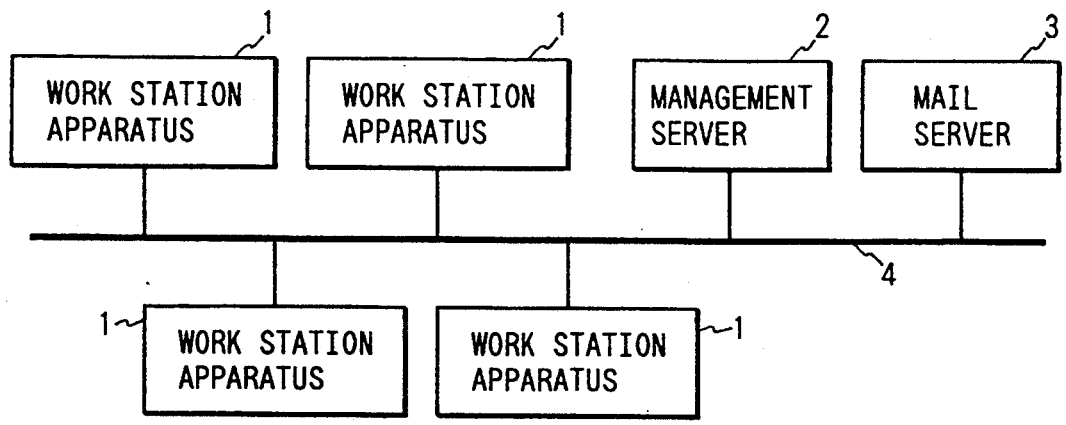
FIG. 1 is a block diagram showing an example of a network to which the present invention is applied.

FIG. 1 is a block diagram showing an example of a network to which the present invention is applied. As shown, a plurality of work station apparatuses 1 for forming documents and processing data are incorporated into a network 4. The network further contains a management server 2 for managing users and groups of the work station apparatuses 1, and a mail server 3 for handling the mail processing and management.

In addition to the above servers, the network contains various types of servers (not shown); a file server for storing and managing files, a printer server for outputting documents or the like to a printer, a scanner server for entering image data, such as drawings and illustrations, and others.

Figure 2:
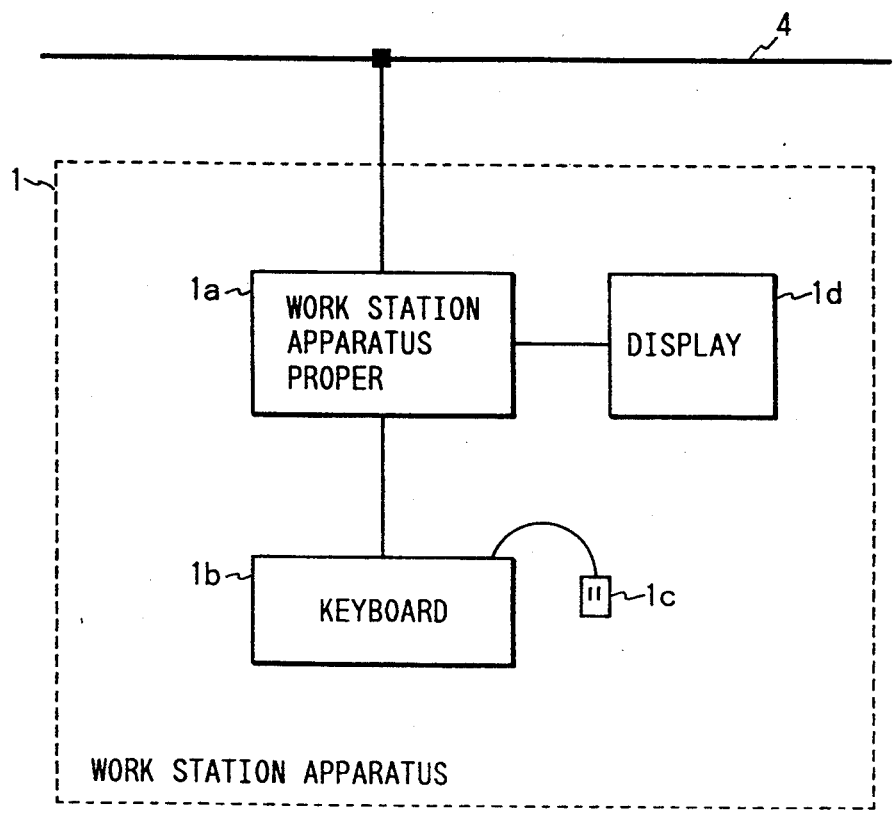
FIG. 2 is a block diagram showing an example of the construction of each work station apparatus in the network of FIG. 1.

Each work station apparatus 1, as shown in FIG. 2, is composed of a work station apparatus proper 1a, a keyboard 1b, a mouse 1c, a high-definition display 1d, and the like.

Figure 3:
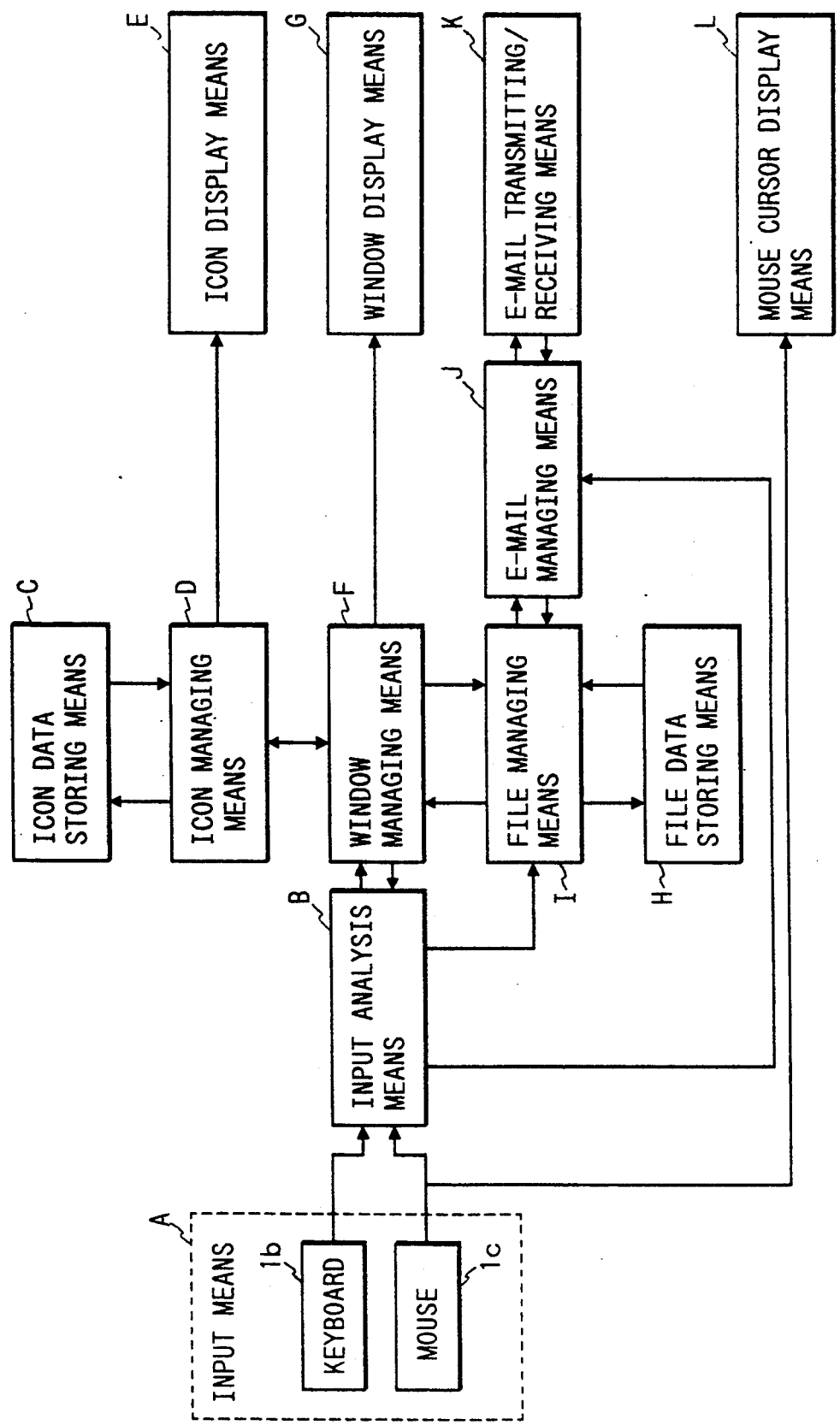
FIG. 3 is a block diagram functionally showing the arrangement of one of the work station apparatus.

FIG. 3 is a block diagram showing the respective functions of the work station apparatus 1. The work station apparatus 1 is functionally composed of an input means A, an input analysis means B, an icon data storing means C, an icon managing means D, an icon display means E, a window managing means F, a window display means G, a file data storing means H, a file managing means I, an electronic mail managing means J, an electronic mail transmitting/receiving means K, a mouse cursor display means L, and the like. The input means A includes a keyboard 1b for entering character trains, instructions, and the like, and a mouse 1c for pointing coordinates on a desk top. The input analysis means B analyzes the input data entered by the input means A. The icon data storing means C stores icon data, such as shapes of various types icons to be displayed on the desk top of the display 1d, display locations, file descriptive data showing files corresponding to icons, and data indicative of the functions of icons.

The icon managing means D is provided for managing the icon data. The icon display means E is for displaying each of the icon data in a given form at a given location on the display 1d. The window managing means F is for managing the windows opened on the display 1d. The window display means G is for displaying a window. The file data storing means H stores file data of documents or the like. The file managing means I manages the file data. The electronic mail managing means J manages the electronic mails. The mail transmitting/receiving means K transmits to and receives electronic mails from another work station apparatus through the network. The mouse cursor display means L displays a mouse cursor on the desk top according to the output signal from the mouse 1c.

Next, the operation of the work station apparatus 1 will be described.

Figure 4:
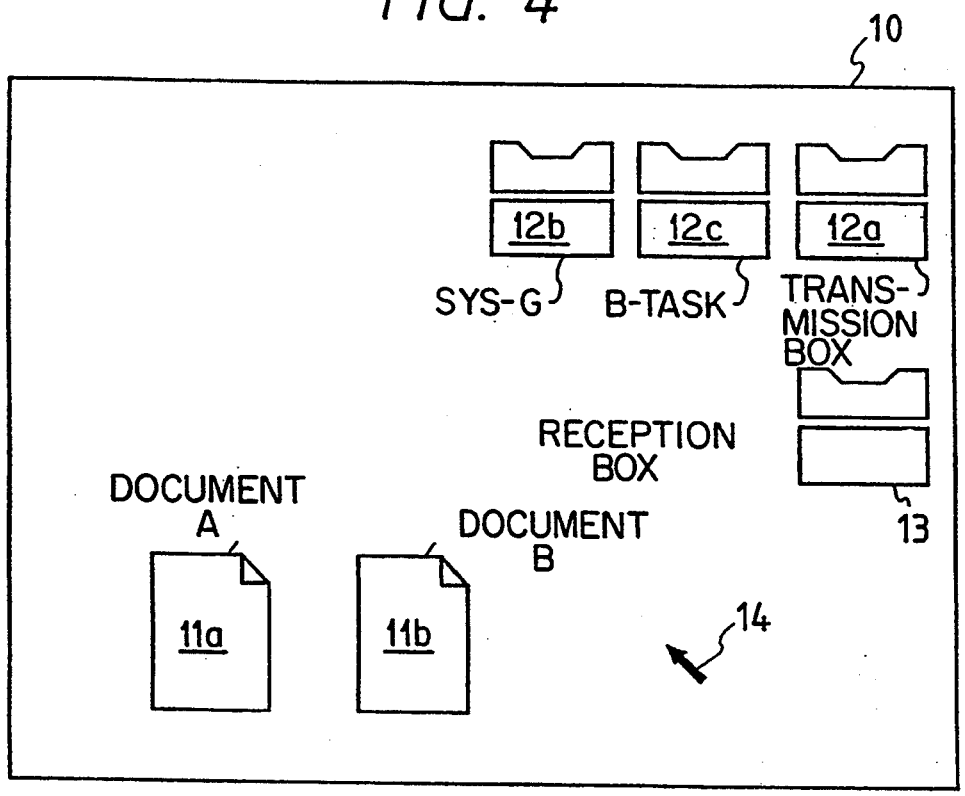
FIG. 4 is a diagram showing an example of display on a desk top in the work station apparatus.

Upon power on of the work station apparatus 1, icon data, such as shapes and types of icons, display locations, and file descriptive data showing files corresponding to icons, are read out of the icon managing means D. According to the readout icon data, the icon display means E displays many icons at preset locations on a desk top 10 of the display 1d, as shown in FIG. 4. The icons displayed on the desk top 10 are: two document icons 11a and 11b named [Document A] and [Document B], a normal transmission box icon 12a, named [Transmission Box], having a destination not yet designated, transmission box icons 12b and 12c, named [Sys-G] and [B-Task], having designated destinations, and a reception box icon 13 named [Reception Box]. A mouse cursor 14, also displayed, is moved on the desk top 10 by operating the mouse 1c.

Particularly, the transmission box icons 12b and 12c are unique icons, which are not used in the conventional work station apparatus.

Figure 5:
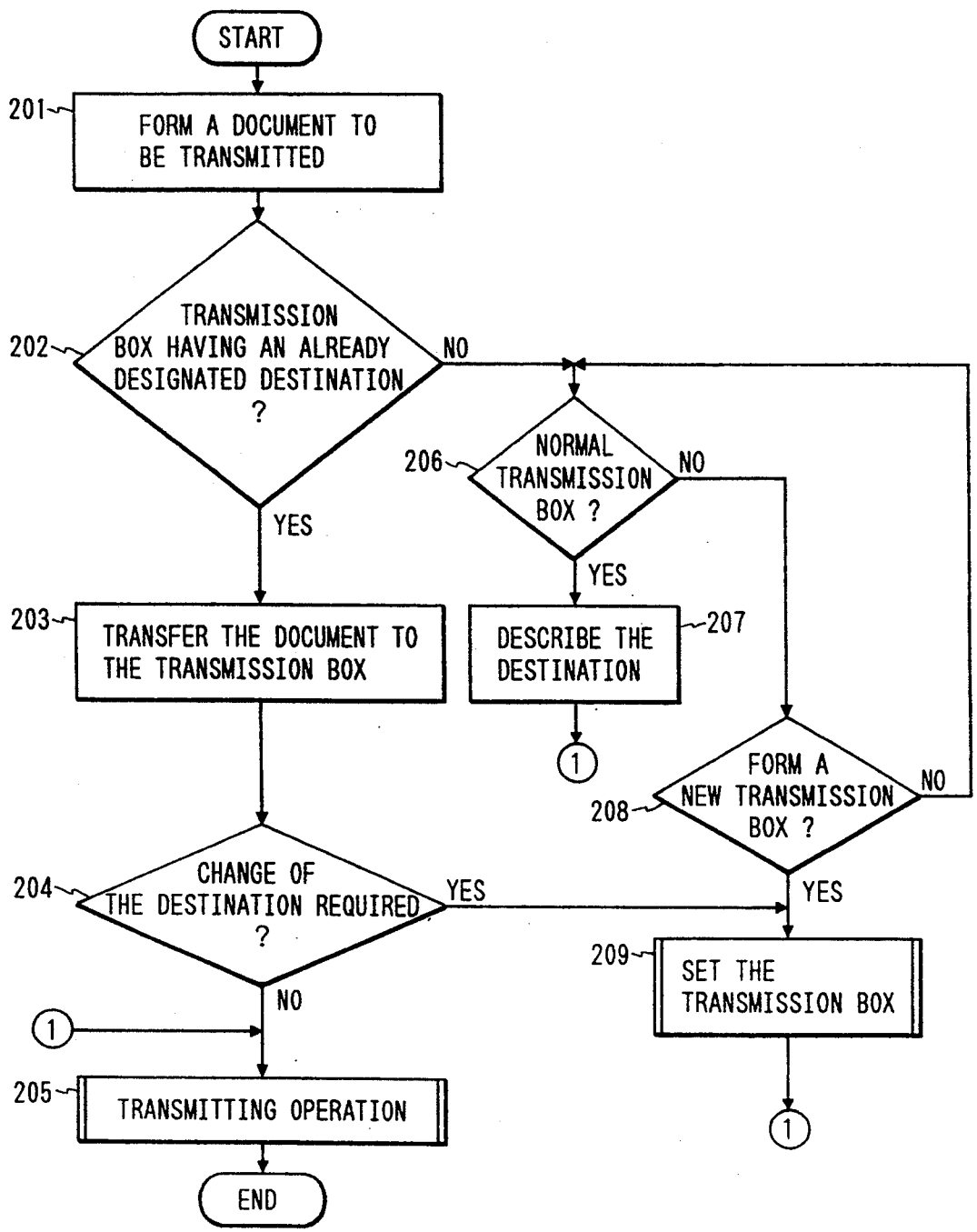
FIG. 5 is a flowchart showing a procedure of transmitting an electronic mail in the work station apparatus of FIG. 1.

An operating procedure for transmitting electronic mails in the work station apparatus 1 will be described with reference to a flowchart of FIG. 5.

At first, a document to be transmitted is formed (step 201). It is assumed now that an intact icon (not shown) has been displayed on the desk top 10 shown in FIG. 4. To form a new document, a user operates the mouse 1c as the input means A to move the mouse cursor 14 onto the intact icon, and then presses a mouse button of the mouse 1c consecutively two times. The input analysis means B recognizes that the object being operated is an intact icon from the location of the mouse cursor where the mouse button is pressed, and that the instruction entered is to open a window. Upon the recognition by the input analysis means, the intact document icon is opened and a document window is displayed. The open/close of the window is carried out by a window management/display unit including the window managing means F, window display means G, icon managing means D, icon display means E, icon data storing means C, and the like. Then, the user moves the mouse cursor 14 into the document window, and presses the mouse button one time. Then, the work station apparatus determines a start position for entering character trains. Character trains entered from the keyboard 1b of the input means A are input from the start position, whereby a document is formed. The document thus formed is automatically stored into the file data storing means H by means of the file managing means I at the time of closing window or when the document formation proceeds. On the desk top 10, it is displayed as the document icon 11a or 11b. Upon formation of the document, the icon managing means D updates the related data in the icon data storing means C.

The document thus formed is then transmitted by the electronic mail. To this end, the user operates the mouse 1c to select the document to be transmitted, for example, [Document A]. Further, it is checked whether there is a transmission box having an already designated destination to which the formed document data is to be transmitted (step 202). If such a box is present, for example, the destination is a group named [B-Task], the selected document is transferred to the transmission box icon 12c having the designated destination (step 203). As the result of the transfer, an electronic mail option sheet 20 is opened on the desk top 10 in a state that the destination [B-Task] preset in the transmission box icon 12c is displayed in a destination field 21, as shown in FIG. 6. Then, the user decides as to whether or not change of the destination is required (step 204). If change of the destination is not required, the user gives an instruction of transmission to the apparatus. Specifically, he places the mouse cursor 14 on a start field 22 and presses the mouse button. Then, the apparatus starts the data transmitting operation (step 205). The details of the transmission operation will be described later.

When in a transmission mode, a transmission box icon having an intended destination is not present, the user uses the normal transmission box 12a as in the conventional manner (step 206), and describes the destination and, if required, the destination for copy on the electronic mail option sheet (step 207). Then, it goes to the step for transmission processing (step 205). In this step, the transmission processing is performed as in the conventional manner. Alternatively, he forms a new transmission box (step 208), and enters a new destination and a destination for copy in the box to set the transmission box (step 209), and it goes to the transmission processing step (step 205).

Figures 7A, 7B:
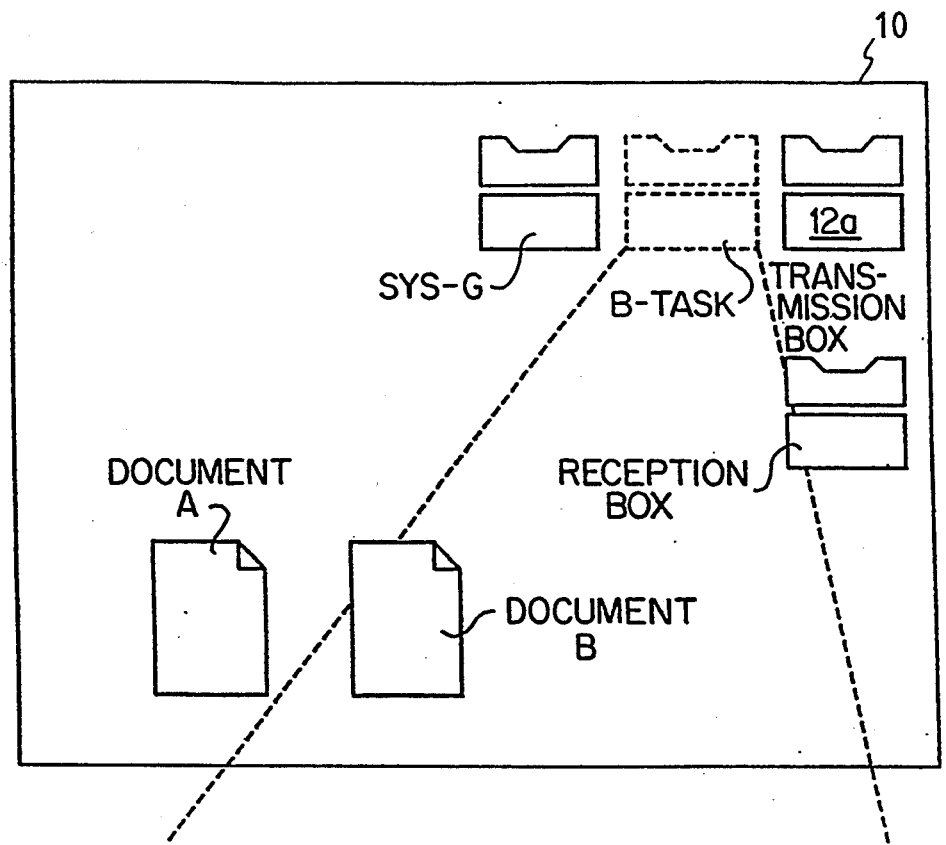
FIGS. 7(a) and 7(b) are diagrams for explaining a transmission box property.

To form a new transmission box, the user transfers the normal transmission box 12a displayed on the desk top 10 (see FIG. 7(a)) to another location, and opens a property window 30 of the transferred transmission box icon. In the initial state, the icon name remains as "Transmission Box", and the fields of the destination, member, and destination for copy are blank. Here, the user changes the icon name to [B-Task] as the name of a group in the destination, as shown in FIG. 7(b). Further, he enters necessary items into those fields. Thus, the transmission box is set. In this way, the user can set desired numbers for the transmission box icons having designated destinations.

To set a transmission box anew, usually the user merely enters a destination for the group. In the instant embodiment, he can add or delete members as will be subsequently described. Generally, an owner of the group has the right to addition or deletion of members, but not any member has such a right. In practical use, the user frequently encounters a situation where he wants to send an electronic mail to a specific member of the group or a person, not a member. It is for this reason that the user can delete a member as a destination or add another person before sending his mail. In this case, the thus changed transmission box icon for a group may be stored.

Figure 8:
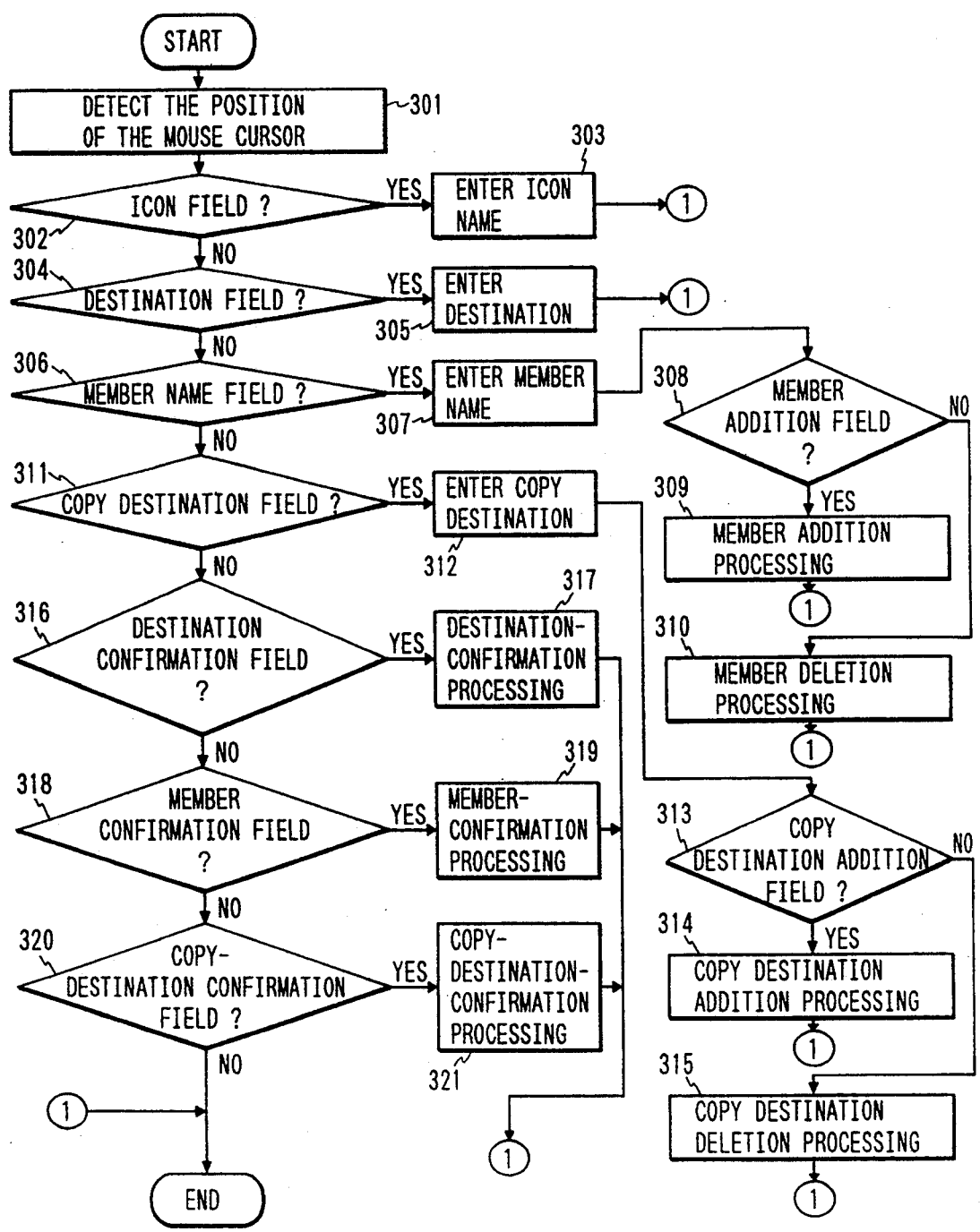
FIG. 8 is a flowchart showing a procedural flow of setting a reception box.

How to set the transmission box will be described in detail with reference to FIGS. 7(a), 7(b) and 8.

In a state in which the property window 30 for destination management is opened, the position of the mouse cursor 14 is first detected (step 301). When an icon field 31 is selected (step 302), from the keyboard 1b a train of characters is entered as the icon name (step 303). When a destination field 32 is selected (step 304), a destination is entered (step 305) as in the previous case. When a member name field 33 is selected (step 306), the name of the member is entered (step 307). When a member addition field 33a is selected (step 308), the name entered is enrolled as a new member into a group of destinations (step 309), and is placed upon a list of members contained in a member display field 34. When a member deletion field 33b is selected (step 308), the entered name is deleted from the group of members (step 310), and also from the list in the member display field 34. When a copy destination field 35 is selected (step 311), the name of the destination for copy is entered (step 312). When a copy destination addition field 35a is selected (step 313), the entered copy destination is additionally enrolled and is displayed in a copy destination field 36 (step 314). When a destination-copy deletion field 35b is selected, the entered destination-for-copy is removed and also from the copy destination field 36 (step 315).

When a destination confirmation field 37 is selected (step 316), the user inquires the destination of the management server 2 through the network 4 shown in FIG. 1. The server confirms as to whether or not the destination is equal to the latest destination data stored in the management server 2. The result of the confirmation is returned to the work station apparatus 1 through the network 4 (step 317). For example, when the destination registered in the property window 30 is equal to the latest destination stored in the management server 2, a message "Deletion Confirmed" or the like is displayed at a given location on the desk top 10. On the other hand, when the corresponding destination is not found, a message "Destination XXX Not Present" or the like is displayed.

When a member confirmation field 38 and a copy-destination confirmation field 39 are selected (steps 318 and 320), a member-confirmation processing (step 319) and a copy-destination confirmation processing (step 321) are performed in the management server 2. Through the processings, the dynamic change in the destination members can also be grasped.

When a transmission box has been set and a complete field 40 is selected, the thus input data on the transmission box are stored, as a transmission box property, in a prescribed area of the memory device of the work station apparatus 1.

Next, the transmission processing in step 205 of FIG. 5 will be described with reference to FIG. 9.

At first, the apparatus checks if the transmission box property is to be displayed (step 401). If the display is required, the transmission box property is displayed (step 402). The user enters the address of the destination or the copy destination, if required (step 403). The apparatus decides whether or not the property is displayed from the state of a flag in the property sheet. Whether or not the entering of address in step 403 rests with the user. Then, an address is set to the document (step 404). The setting of address is automatically done by the system. The process in step 404 indicates that the destination and the like previously set in the transmission box icon are transferred to a document destination field. Then, a mail is sent to the destination of the address that is set (step 405), and a transmission history of the transmission box is updated (step 406). The details of the transmission history will be described later.

In step 401, if the transmission box property is not to be displayed, it is checked whether or not the address has been described in the transmitted document (step 407). If it has been described, step 405 is executed. In step 407, if the address has not been described yet, it is checked whether the address has been described in the transmission box property (step 408). If it has been described, step 404 is executed. If it has not been described, step 402 is executed.

Next, the transmission history will be described.

Figure 9:
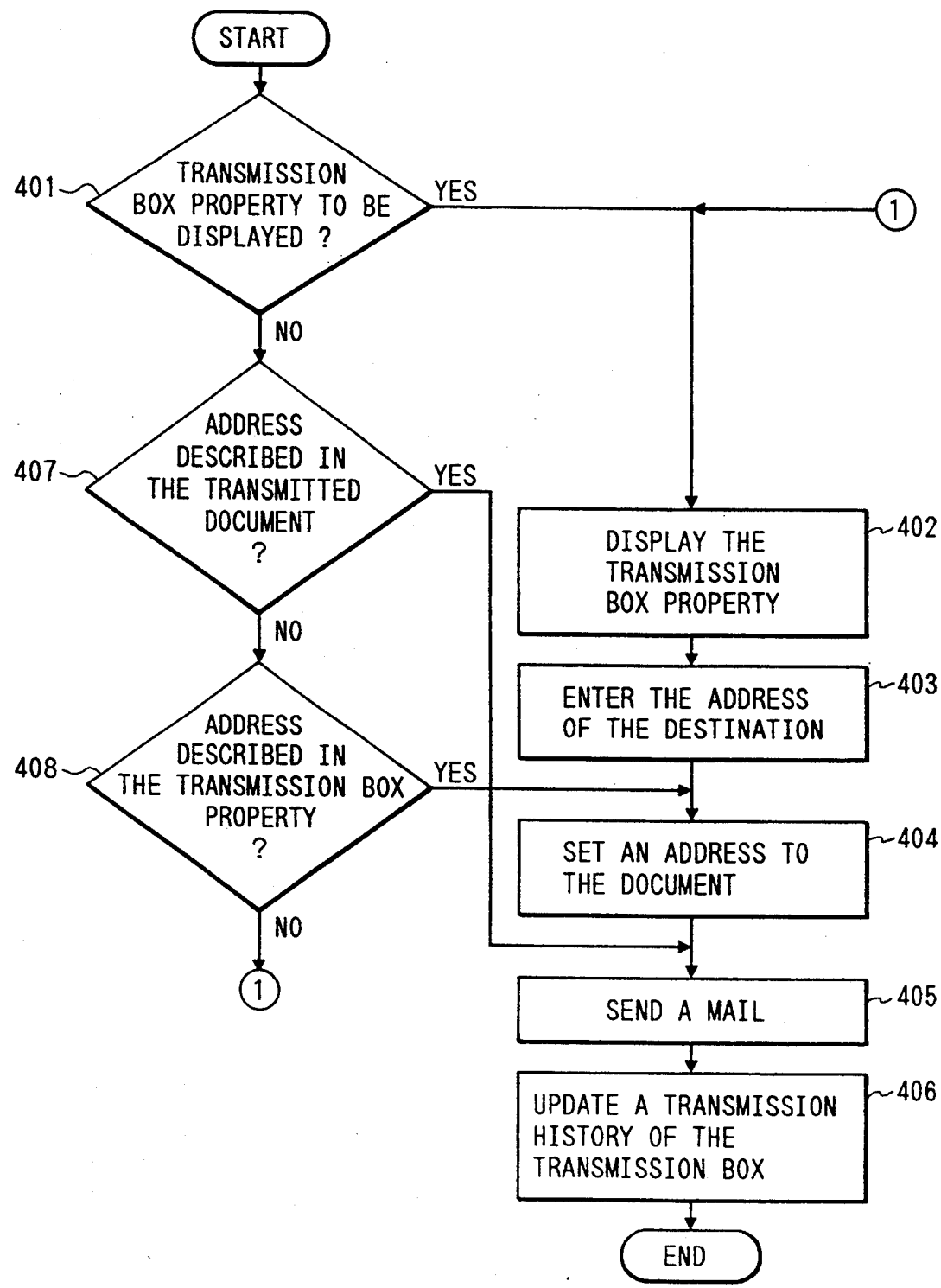
FIG. 9 is a flowchart showing a procedural flow of processing the transmission of an electronic mail.

In the flowchart shown in FIG. 9, every time an electronic mail is transmitted, transmission number data indicating a serial number of electronic mail transmission, and date data indicating date of electronic mail transmissions are generated. A case name attached to the electronic mail (see FIG. 6) is also picked up. Those items of data of transmission number, date, and title are time-sequentially stored into predetermined areas in the memory device of the work station apparatus 1. The transmission history is formed for each transmission box.

Figure 10A:
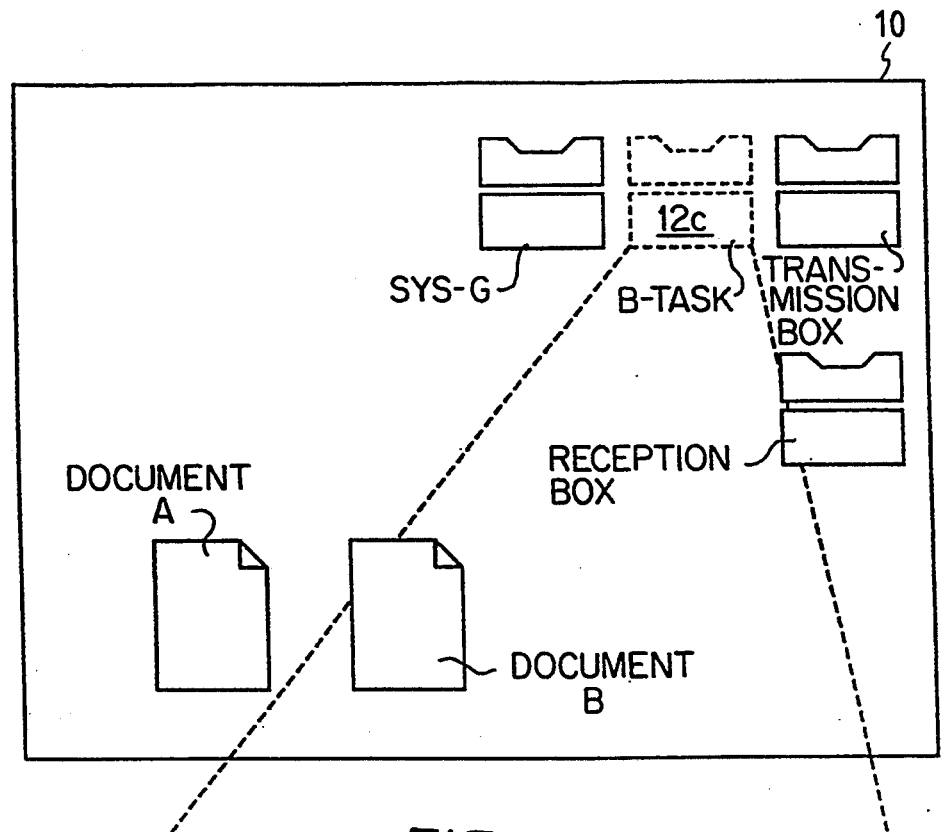
FIGS. 10(a) and 10(b) are diagrams for explaining a transmission history window.
Figure 10B:
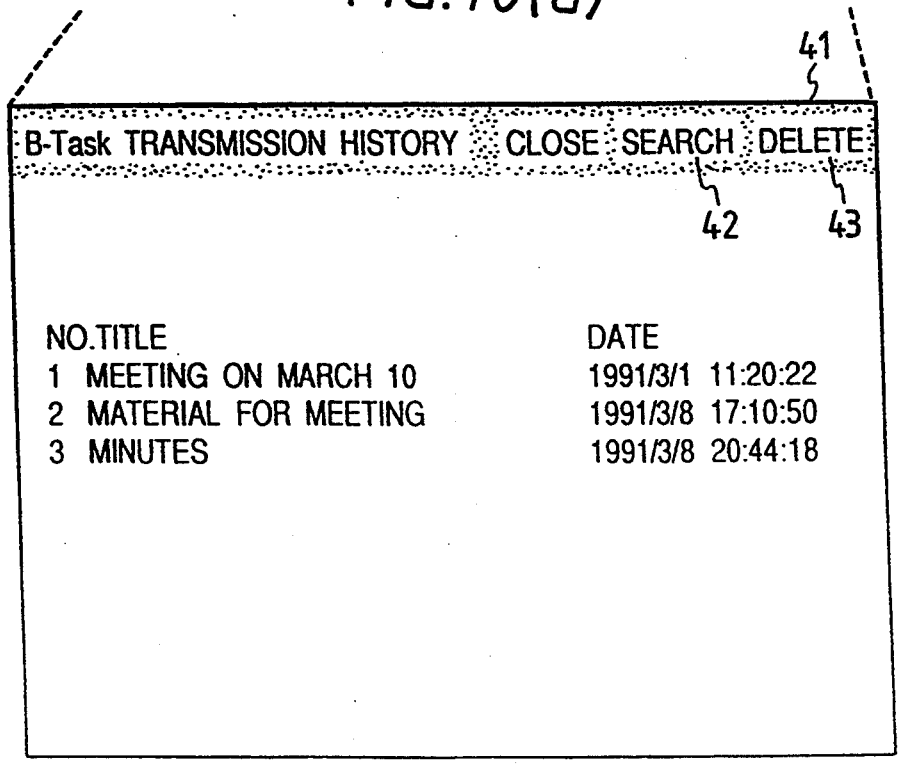
Figure 11:
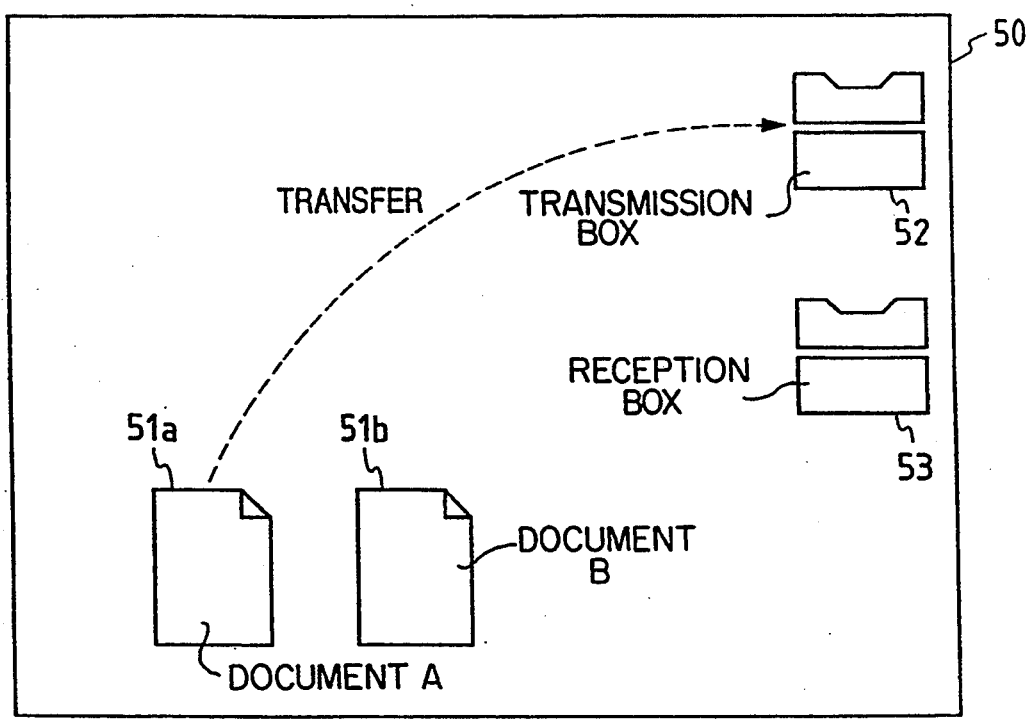
FIG. 11 is a diagram showing an example of display on a desk top in a conventional work station apparatus.
Figure 12:
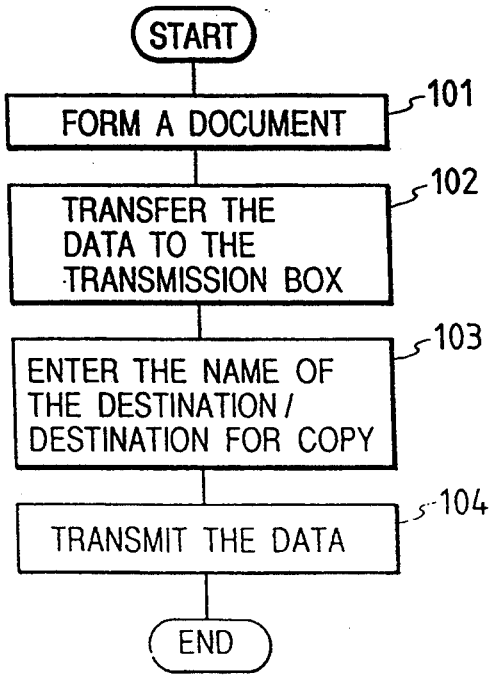
FIG. 12 is a flowchart showing a procedural flow of transmitting an electronic mail in the conventional work station apparatus.

The transmission history is displayed on the desk top in the following procedural operations. The user opens a transmission box 12c named [B-Task] that is displayed on the desk top 10 as shown in FIG. 10(a). Then, the transmission history data, which corresponds to the selected transmission box, is read out of the memory device, so that a transmission history window 41 is displayed. As shown in FIG. 10(b), transmission number, title, transmission date, and the like are time-sequentially arrayed in the transmission history window 41.

As described above, the mails destined toward specific groups are managed by the transmission box icons. Each transmission box icon stores the transmission history of the mail directed to the group in the form of a list, and displays it in the same form. For example, when the user wants to confirm the electronic mail that has been transmitted to a specific group, he can make an easy and correct confirmation because only the data necessary for the user is neatly displayed. The transmission history window 41 further contains a search field 42 for searching and picking up intended mails and a deletion field 43 for deleting an unnecessary transmission history.

As seen from the foregoing description, in the invention, the transmission box icon is provided for each destination. With this unique construction, where electronic mails are frequently transmitted, a simple and efficient transmission procedure is realized without mistakes in the entering procedure for destination, names, and the like.

Further, the user can change a member contained in the destination group. Accordingly, he can send a document to only a necessary destination or destinations according to the contents of the document.

Additionally, the transmission history is stored for each destination. Therefore, the user can easily and correctly confirm the transmission document.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A work station apparatus having an electronic mail function comprising:
   a display unit having a display screen;
   at least one transmission box icon having specific destination data and at least one object icon indicative of objects to be transmitted, said at least one transmission box icon and at least one object icon being displayed on the display screen;
   means for generating an instruction for transmitting an electronic mail, said instruction selecting a desired object icon and a desired transmission box icon and positioning the desired object icon on the desired transmission box icon;
   means for generating destination data corresponding to the specific destination of the at least one transmission box icon;
   storing means for storing the destination data;
   assigning means for assigning the destination data corresponding to the selected transmission icon to an object corresponding to the selected object icon in response to the instruction for transmitting the electronic mail; and
   transmitting means for transmitting the object according to the assigned destination data.

2. The work station apparatus according to claim 1, wherein said destination data includes information regarding destination user members.

3. The work station apparatus according to claim 2, further comprising means for changing the information about the destination user members.

4. The work station apparatus according to claim 1, further comprising a plurality of transmission box icons displayed on the screen.

5. The work station apparatus according to claim 4, further comprising:
   means for storing transmission history data for each of the transmission box icons, the transmission history data being indicative of transmissions of each of the transmission box icons; and
   means for displaying the transmission history data on the display screen of the display unit.

* * * * *